(12) United States Patent
Jacobsen et al.

(10) Patent No.: US 7,383,851 B2
(45) Date of Patent: Jun. 10, 2008

(54) CLOSED LOOP PRESSURE CONTROL SYSTEM AND ELECTRICALLY OPERATED PRESSURE CONTROL VALVE WITH INTEGRAL PRESSURE SENSOR AND METHOD OF MAKING SAME

(75) Inventors: Peter M. Jacobsen, Oakland Township, MI (US); Greg E. Ford, Detroit, MI (US); Timothy J. Green, Holly, MI (US); Harold L. Bowman, Lapeer, MI (US)

(73) Assignee: Eaton Corporation, Cleveland, OH (US)

( * ) Notice: Subject to any disclaimer, the term of this patent is extended or adjusted under 35 U.S.C. 154(b) by 367 days.

(21) Appl. No.: 10/960,624

(22) Filed: Oct. 7, 2004

(65) Prior Publication Data

US 2006/0081288 A1    Apr. 20, 2006

(51) Int. Cl.
G05D 16/20    (2006.01)
(52) U.S. Cl. .............. 137/14; 137/487.5; 137/557; 73/756
(58) Field of Classification Search ............ 137/14, 137/487.5, 557; 251/129.15; 73/756; 91/459
See application file for complete search history.

(56) References Cited

U.S. PATENT DOCUMENTS

| | | | | |
|---|---|---|---|---|
| 4,413,509 A | * | 11/1983 | Moser et al. | ............... 73/117.3 |
| 5,692,813 A | * | 12/1997 | Vellmer | ................... 303/119.2 |
| 5,855,229 A | * | 1/1999 | Gluf, Jr. | ................... 137/884 |
| 5,918,856 A | | 7/1999 | Scharnowski | |
| 5,937,898 A | * | 8/1999 | Gluf et al. | ................... 137/560 |
| 6,196,253 B1 | | 3/2001 | Love | |
| 6,308,725 B1 | | 10/2001 | Lawlyes et al. | |
| 6,374,814 B1 | | 4/2002 | Cook | |
| 6,422,206 B1 | | 7/2002 | Wade et al. | |
| 6,443,174 B2 | | 9/2002 | Mudd | |
| 6,539,968 B1 | | 4/2003 | White et al. | |
| 6,745,634 B2 | * | 6/2004 | Beck et al. | ................... 73/756 |
| 6,805,150 B1 | * | 10/2004 | Dion et al. | ................. 137/269 |
| 6,843,271 B2 | * | 1/2005 | Weldon et al. | ............ 137/487.5 |
| 2002/0101113 A1 | * | 8/2002 | Tracht et al. | ............. 303/113.1 |

FOREIGN PATENT DOCUMENTS

| | | |
|---|---|---|
| EP | 0 681 128 | 11/1995 |
| EP | 0 869 286 | 10/1998 |
| EP | 1 196 725 | 4/2002 |
| JP | 57129978 | 8/1982 |
| JP | 58200873 | 11/1983 |

OTHER PUBLICATIONS

PCT Search Report, PCT/IB2005/002977 search completed Feb. 16, 2006.

* cited by examiner

*Primary Examiner*—Ramesh Krishnamurthy
(74) *Attorney, Agent, or Firm*—Anna M. Shih

(57) ABSTRACT

A solenoid operated valve has a pressure transducer sensing valve outlet pressure integrally formed in the valve body, such as by overmolding. Upon connection of the transducer and solenoid to an electronic controller, the controller generates a valve energization signal in response to a desired valve pressure output and the transducer input for providing closed loop control of the valve outlet pressure. An ASIC may also be integrally formed in the valve body, such as by overmolding for providing integrated signal conditioning; and, the optional ASIC, if employed, may also include the circuitry for the electronic controller for providing a "smart" pressure control valve.

21 Claims, 7 Drawing Sheets

CLOSED LOOP PRESSURE CONTROL SYSTEM AND ELECTRICALLY OPERATED PRESSURE CONTROL VALVE WITH INTEGRAL PRESSURE SENSOR AND METHOD OF MAKING SAME

BACKGROUND OF THE INVENTION

The present invention relates to fluid pressure control systems where it is desired to employ closed loop control utilizing electrically operated valves, and particularly valves of the type operated by a solenoid, for providing pressure control of fluid in a system in response to an electrical signal from an electronic controller.

Solenoid operated valves have found widespread application in systems where it is desired to control fluid pressure to a fluid pressure actuated device such as pneumatic or hydraulically pressure actuated valves, pistons or diaphragms. More particularly, solenoid operated pressure control valves have found widespread use in automotive applications inasmuch as solenoids have proven to be cost effective valve operators capable of energization by the low voltage direct current power supplies typically available on motor vehicles.

An example of the aforesaid automotive applications of solenoid operated pressure control valves is that of utilizing the solenoid operated valve to control the pressure of the hydraulic fluid employed for actuating the shift clutches in an automatic speed change gear set power transmission employed for providing the traction power for vehicle propulsion.

Automatic transmission applications of solenoid operated pressure control valves have heretofore required precise calibration of the solenoid valve to provide the desired pressure output for clutch operation in response to the electrical control signal from the vehicle powertrain controller. In addition, such applications have required extremely tight tolerances on the hysteresis of the valve with respect to valve response from increasing and decreasing electrical control signals. If the valve has a significant amount of hysteresis, or is not repeatable with respect to successive signal applications for the same desired pressure output, the operation of the transmission shift clutches will be jerky or erratic and thus objectionable to the vehicle operator.

The aforesaid problem of accuracy and repeatability of the actuation of an electrically operated pressure control valve operating in an open loop control mode, and particularly solenoid operated valve, irrespective of the application. Thus it has been desired to improve the accuracy and repeatability of solenoid operated pressure control valves for all fluid pressure control applications. Therefore, it has been proposed to use closed loop control mode of operation of solenoid valves.

Published U.S. Application 2004-0122577 published Jun. 24, 2004, assigned to the assignee of the present invention, teaches closed loop control of the shifting of an automatic speed change gear set transmission by utilizing a pressure sensor in the outlet of each solenoid operated pressure control valve for controlling the actuating pressure to the individual shift clutches in the transmission. The pressure sensors in the arrangement of the aforesaid publication are disposed to sense the pressure in the outlet line of the respective solenoid operated pressure control valve to provide a pressure feedback signal to an electronic controller for valve energization and operating the valve in closed loop control of the valve outlet pressure.

Co-pending, commonly assigned U.S. Pat. No. 6,929,031, issued Aug. 16, 2005 and entitled "Electro-Hydraulic Manifold Assembly With Lead Frame Mounted Pressure Sensors" teaches a plurality of solenoid operated pressure control valves mounted in a manifold with a plurality of pressure sensors disposed on an electrical lead frame mounted on the manifold wherein each pressure sensor communicates with the outlet of the individual pressure control valve for sensing the pressure therein.

In co-pending, commonly-assigned U.S Publication No. 2005/0039807, published Feb. 24, 2005 and entitled "Electric Fluid Servo Valve And Method Of Making Same" in the name of Greg E. Ford et al., teaches mounting a pressure sensor on a printed circuit board and attaching the printed circuit board to a valve body of a solenoid operated pressure control valve with the pressure sensor communicating through a sensing port in the valve body with the valve outlet.

The aforesaid closed loop control arrangements for solenoid operated pressure control valves have required that the pressure sensor be externally mounted to communicate with the pressure in the valve outlet and electrically connected separately with the solenoid operator for the valve. In the aforesaid closed loop control arrangements, it is required to install the valve in the hydraulic circuit or a mounting manifold and to provide separate installation of the pressure sensors for communication with the outlet pressure signal from each valve and to connect the pressure sensors and valves separately in an electrical circuit. This has the disadvantage of requiring a separate mounting structure in the hydraulic circuit to provide mounting for the pressure sensors and provision for separate electrical connection thereto which has added significant costs to the arrangement in high volume mass production of motor vehicle automatic transmissions.

Therefore, it has been desired to provide a way or means of sensing the pressure in the outlet of a solenoid operated pressure control valve without separately mounting pressure sensors to the valve or in the pressure outlet line of the valve and to provide such in an easy to manufacture and cost effective manner.

BRIEF SUMMARY OF THE INVENTION

The present invention addresses the above-described problem and provides closed loop control of an electrically operated system which uses a fluid pressure actuator for effecting a function to be controlled. The system may be employed for fluid pressure actuators operating on either compressible fluid such as air or substantially incompressible fluids such as hydraulic fluids, water or oil.

The fluid pressure control is provided by an electrically operated valve having a valve body with a pressure transducer integrally formed therein which provides an electrical signal indicative of the pressure at the valve outlet. An electronic controller receives an electrical signal from the transducer; and, in response to an electrical fluid pressure command signal, the controller generates an electric control signal for operating the valve, thereby providing closed loop control of the fluid pressure actuator. The pressure transducer is formed integrally with the valve body and may be insert cast or overmolded in the valve body. An optional ASIC may also be integrally formed in the valve body by overmolding. The pressure transducer may optionally be mounted on a substrate or circuit board prior to overmolding. The substrate or circuit board may contain electrical connector terminals which engage the solenoid operator for the valve in plug-in engagement at assembly. Optionally, the ASIC may include additional electronics for controller functions in the valve for minimizing or eliminating the amount of control functions and electronic circuitry required for external or remote connection. The valve body has electrical connector terminals which, on external engagement thereto, provide in-circuit connection to both the transducer and the solenoid operator for the valve; and, these terminals may be mounted on the substrate or circuit board, if one is employed.

In its simplest form, the valve body has an integrally formed pressure transducer for use in a closed loop control system interfacing with a remotely disposed controller. However, the electronic controller may be incorporated in the valve in an ASIC which may be also formed integrally in the valve body such as by overmolding.

The present invention has particular application in systems requiring control of pneumatic or hydraulic actuators for effecting a control function. The system has been found suitable for applications on-board a motor vehicle where low voltage direct current is an available power source for operating a solenoid valve. The present invention provides an electrically operated pressure control valve with a pressure transducer integrally formed such as by overmolding to enable closed loop control mode of operation from an electronic controller. An optional ASIC may also be integrally formed in the valve body such as by overmolding to enable incorporating the electronic controller in the valve to provide self-contained closed loop control and thus provides a "smart" valve.

DETAILED DESCRIPTION OF THE INVENTION

Figure 1:
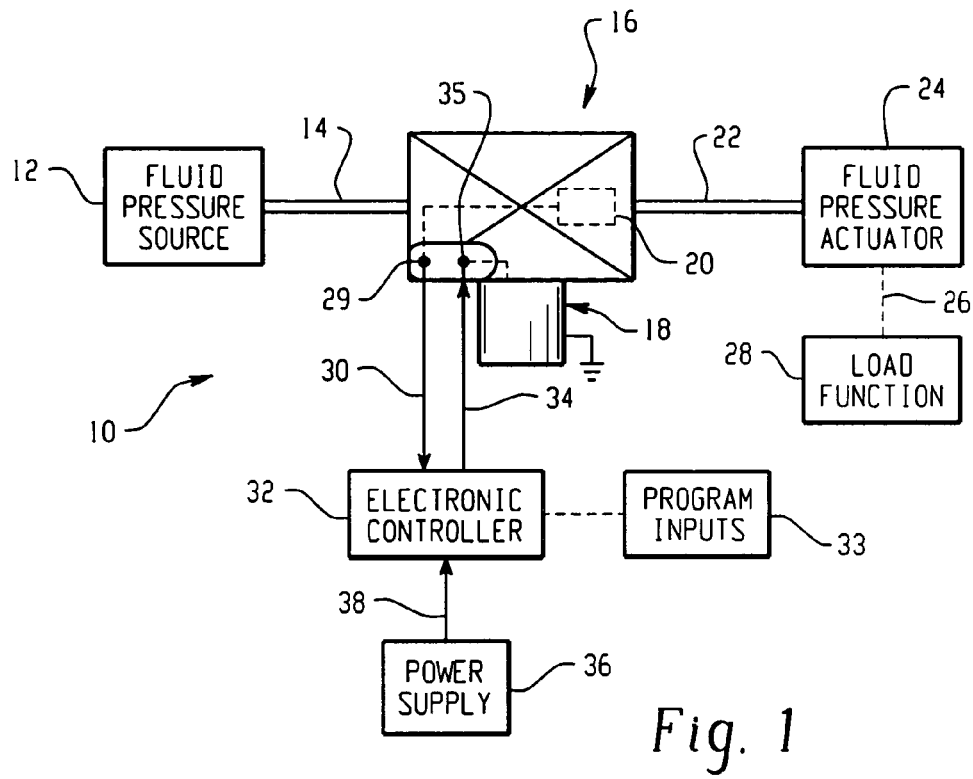
FIG. 1 is a block diagram of one embodiment of the system of the present invention.
Figure 5:
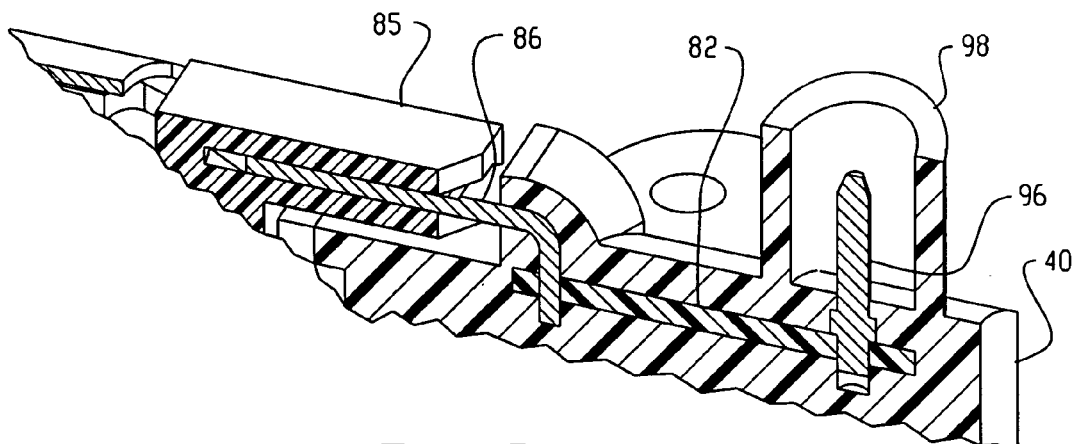
FIG. 5 is a partial section view taken longitudinally off-center of the valve of FIG. 3 showing the connector terminals on the circuit board.

Referring to FIG. 1, a system employing the present invention for closed loop control is indicated generally at 10 as having a source of fluid pressure 12 applied along a conduit 14 to an electrically operated valve assembly indicated generally at 16 which includes an electric operator 18; and, the valve 16 includes a pressure transducer 20 indicated in dashed outline and which is integrally formed therein. In the present practice of the invention it has been convenient to employ a solenoid for operator 18, however, other types of electric operators may be employed such as a bi-metal operator or a servo motor operating through a speed reducer or a stepper motor. The control pressure output of the valve is supplied along the conduit 22 to a fluid pressure actuator 24 which provides a mechanical output, indicated by dashed outline 26, to the desired load function 28. The embodiment of the valve 16, with operator 18, described and shown in the drawings has been found suitable for use in a motor vehicle automatic transmission application; however, the invention valve 16 may be used in any fluid pressure control system of the type shown in FIG. 1.

In the embodiment illustrated, the valve 16 has an electrical terminal 29 connected to provide an output signal from transducer 20 along line 30 to an electronic controller 32. The electronic controller 32 is operative to provide a pressure command signal along line 34 to an electrical terminal 35 for power input to the electrical operator 18. The electronic controller 32 may be powered by an appropriate power supply 36 shown connected thereto along line 38. In automotive applications valve operator 18 is of the type capable of operating on the 12 volt DC on-board power. It will be understood that controller 32 may optionally receive program inputs as denoted by reference numeral 33 and the dashed line connection in FIG. 1, such as from an on-board engine or powertrain controller The controller 32 may be programmed with a control algorithm for generating the energization signal for the valve operator 18 to give the required pressure to the actuator 24 for effecting the desired function of load 28.

As will hereinafter be described in greater detail, the transducer 20 may include an application specific integrated circuit (ASIC) programmed with the valve response characteristics of the particular type of valve and may thus minimize the complexity of or eliminate the electronic circuitry required in controller 32 to operate the valve in a particular system.

Figure 2:
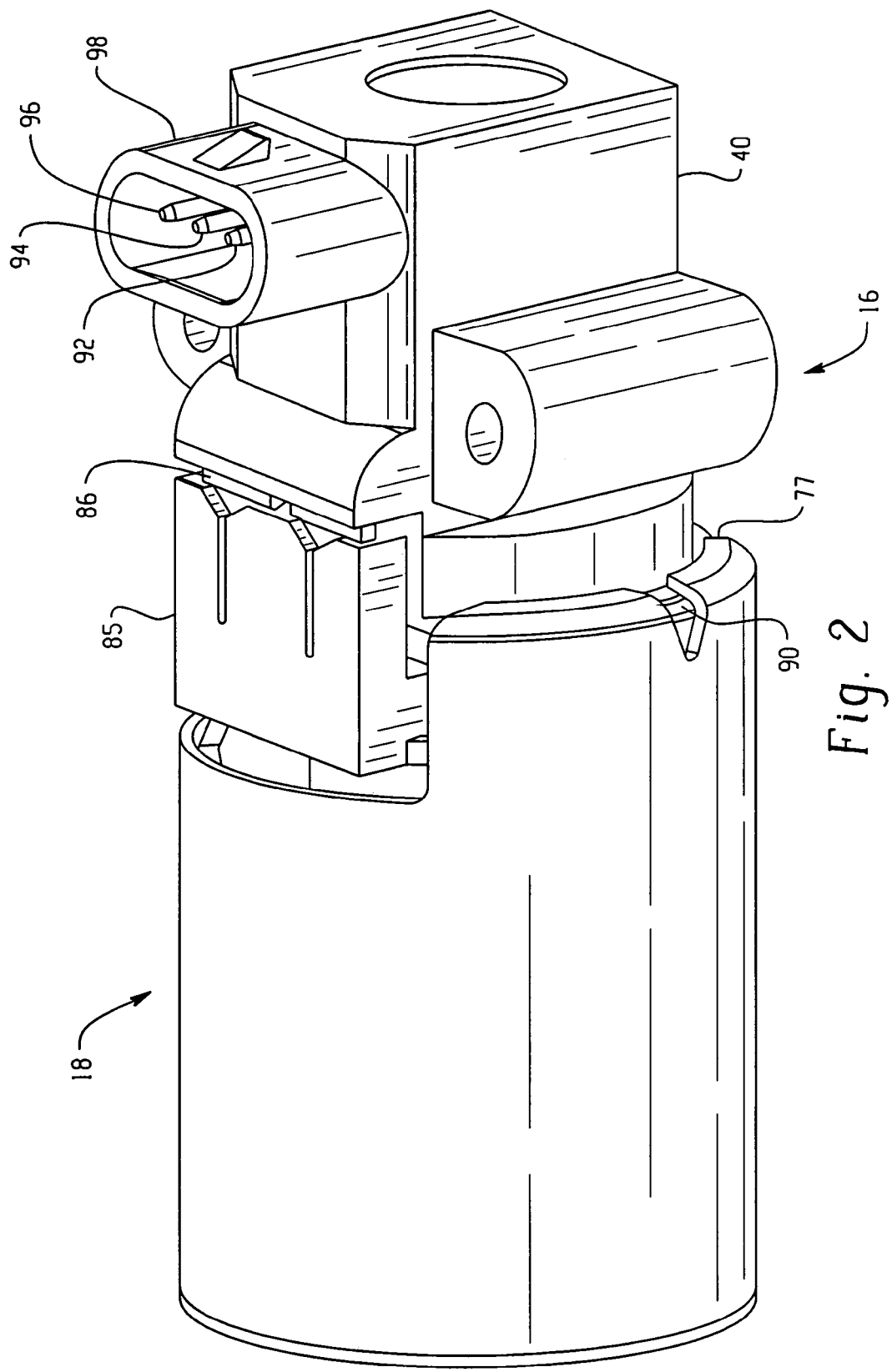
FIG. 2 is an axonometric view of a valve employed in the system of FIG. 1.
Figure 3:
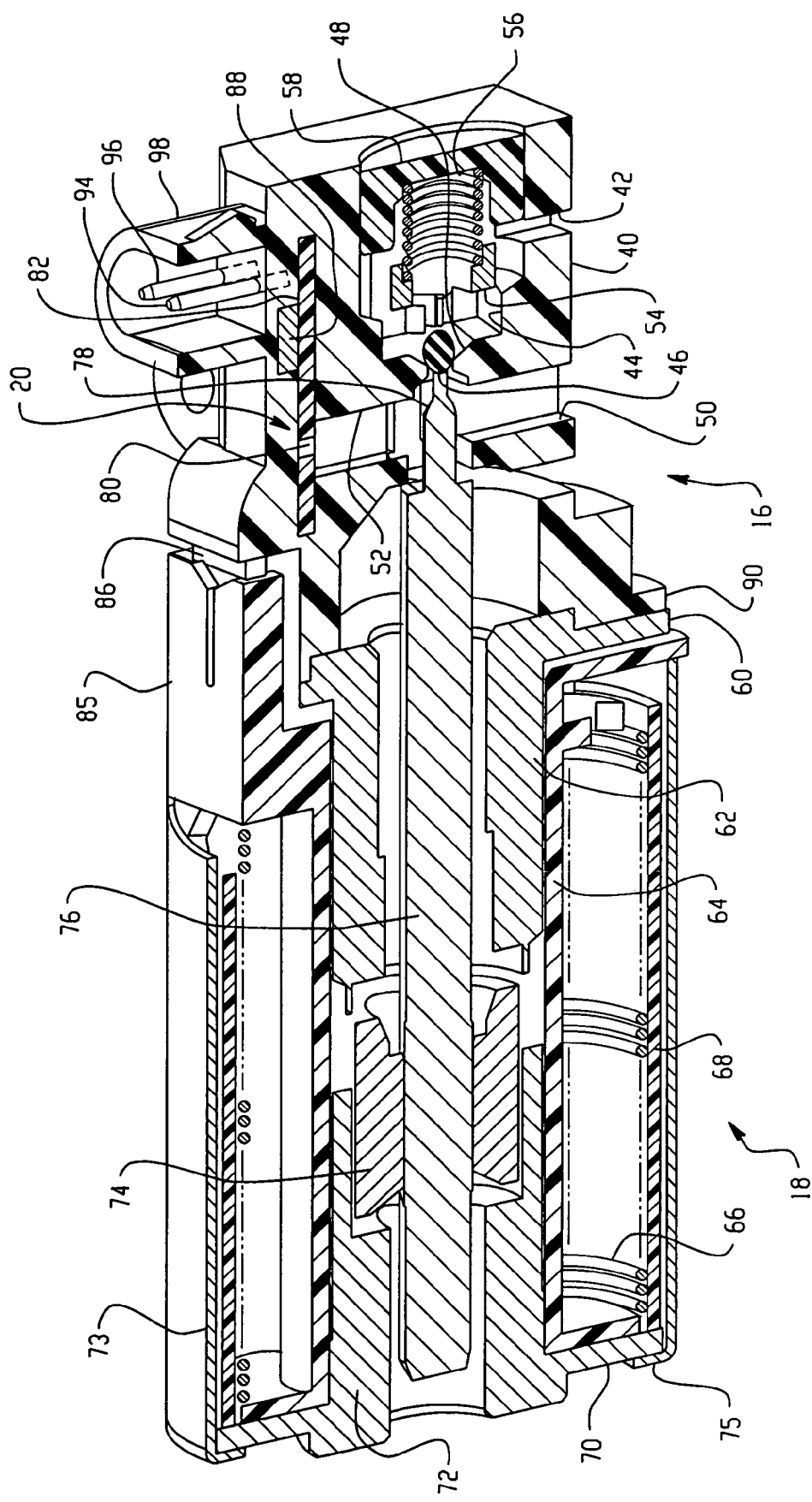
FIG. 3 is a section view taken through the longitudinal center line of an embodiment of the valve of FIG. 2 employing a circuit board.
Figure 4:
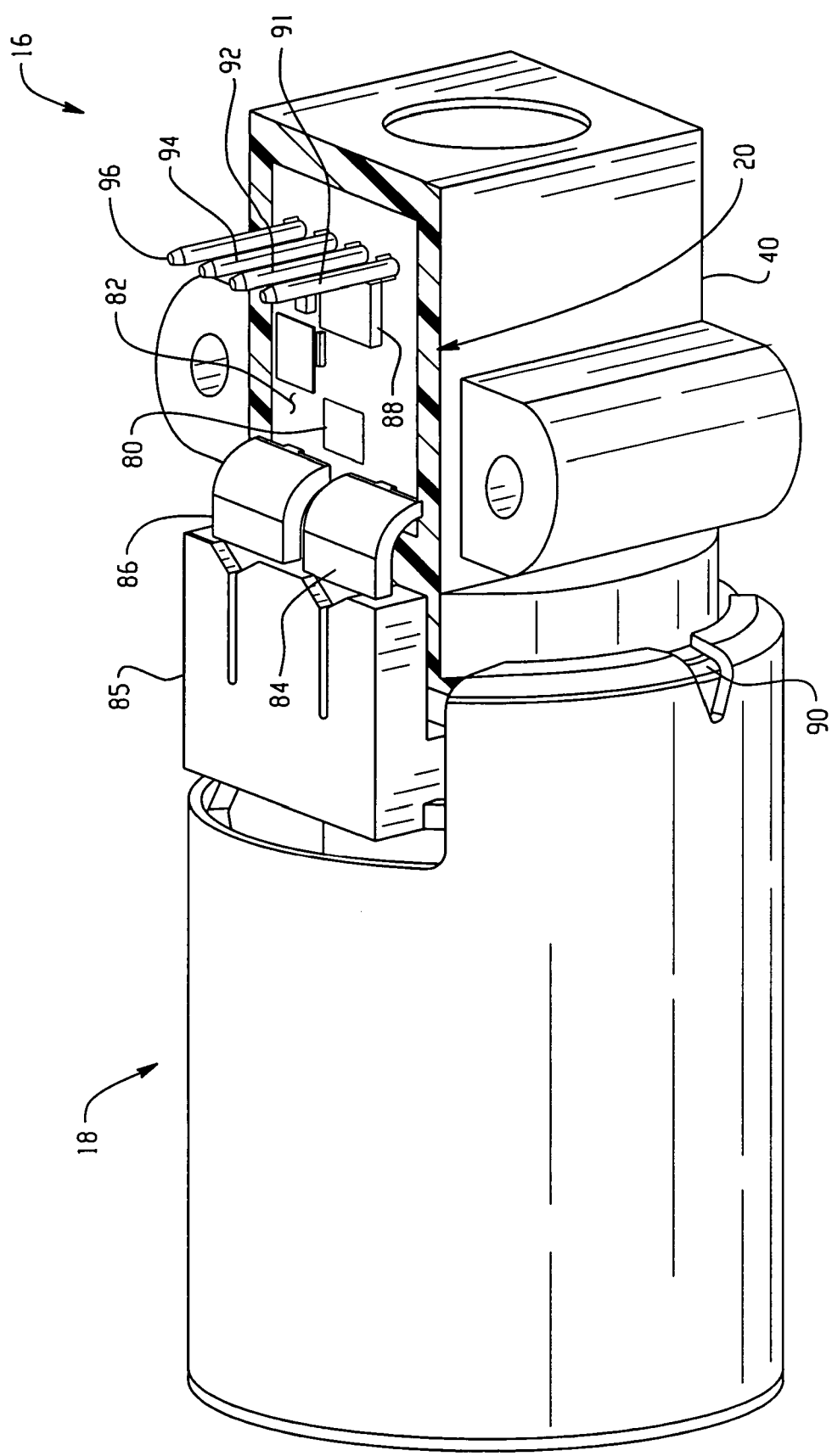
FIG. 4 is a view similar to FIG. 2 with portions of the body cut away to show the circuit board.

Referring to FIGS. 2 through 4, an embodiment of the valve 16 employed in the system of FIG. 1 is illustrated in greater detail and includes a body 40 formed of non-metallic material. The body may be formed by any suitable forming technique such as, molding, injection molding, insert molding or casting. In the present practice of the invention employing valve 16 it has been found satisfactory to form the valve body of molded plastic material which is chosen for compatibility with the service environment and the fluids to be valved. In the present practice of the invention, molded polyamide material partially filled with glass particles has been found satisfactory for general usage with water and air. However, for hydraulic oil applications, such as automatic power transmissions for shift clutch control, it has been found satisfactory to form the valve body of molded polyetheramide material partially filled with particulate glass material. It has also been found satisfactory to use polyetheramide material filled with about ten to forty percent (10-40%) by volume fine glass particles for hydraulic fluid applications. Another example of a satisfactory material is polythalamide which may also be partially filled with fine glass particles. These aforesaid materials have been found particularly suitable for elevated temperature service for temperatures up to about 140° C. with hydraulic fluid. It will be understood however that other materials suitable for molding or casting may be used.

The valve body has a fluid pressure inlet 42 formed therein which communicates with a valving chamber 44 having a moveable valve member 46 disposed therein, which may have any desired configuration suitable for the pressures encountered, such as a spherical configuration which is moveable with respect to an annular valve seat 48. The valve seat communicates with pressure control outlet port 50 and also with a pressure sensing port 52 formed in the body, and for convenience extending to the opposite side of the valve body from the outlet 50.

The moveable valve member 46 may be retained by any suitable expedient such as by retainer 54 which for convenience has an annular configuration and which is biased in a direction to close the valve member 46 against seat 48 by a spring 56 retained and sealed in the cavity 44 by a retaining plug 58.

The valve body 40 has a flux collector 60 attached to the end thereof opposite the plug 58, which flux collector may have an annular configuration as illustrated, with an elongated pole piece portion 62 extending axially therefrom. The pole piece portion 62 has received thereover bobbin 64 which has disposed thereon a coil 66 of electrical conductor which is adapted for connection thereto as will be described hereinafter.

The coil 66 may have an annular insulator 68 received thereover. A second flux collector 70 which may have an annular configuration is disposed on the end of the coil opposite the flux collector 60; and, flux collector 70 also has a pole piece portion 72 extending interiorly of the bobbin.

An armature 74 is provided which may also have an annular configuration, is disposed within the coil 66 and includes an operating rod 76 portion disposed thereon and moveable therewith and extending axially therefrom toward the valve member 46. The operating rod may have a reduced diameter portion 78 formed adjacent the end thereof and which is received through the valve seat with the end thereof operable for contacting the valve member 46.

It will be understood that, in operation, energization of the coil causes armature 74 and operating rod 76 to move rightwardly with respect to FIG. 3 and displace the valve member 46 from the valve seat 48 to effect fluid flow from the chamber 44 to the outlet 50.

Although a valve operator 18 comprising a solenoid has been shown and described herein, it will be understood that other types of valve operators may be employed such as electrically heated bimetal operators or a servomotor operating through a speed reducer or a stepper motor.

Referring to FIGS. 3 and 4, and as mentioned hereinabove with respect to FIG. 1, the pressure transducer 20 includes a solid state device or die 80, which may be of the piezoelectric or other suitable variable impedance type, disposed over the sensing port 52 for sensing pressure therein. In the present practice of the invention it has been found satisfactory to use a piezoelectric die of the type commercially available from Sentir Semiconductor, Inc., Santa Clara, Calif. and bearing manufacturers APD301 Series 5000 Ohm Medium Pressure Sensor die. However, other types of solid state devices may be employed which are designed to sense pressure in the same range, and have similar electrical impedance properties and are sufficiently robust to operate at temperatures of up to about 140° C. while exposed to hydraulic fluids in elevated temperature service, particularly motor vehicle automatic transmission service.

In the simplest form of the invention, as shown in FIG. 1, the die 80 may be overmolded directly in the material of the valve body. In the embodiment of the valve 16 shown in the drawings, the valve has the die 80 optionally, for convenience in molding, mounted on a substrate, such as a circuit board 82, prior to overmolding. The substrate or circuit board may be either of flexible or rigid type and may be formed of suitable material, such as ceramic or plastic material. As shown in the drawings, the substrate or circuit board has terminal strips 84, 86 extending at one end for connection to an electrical receptacle 85 provided on the valve body. Alternatively, the substrate or circuit board may have wires soldered or crimped to the solenoid coil conductor.

Figure 8:
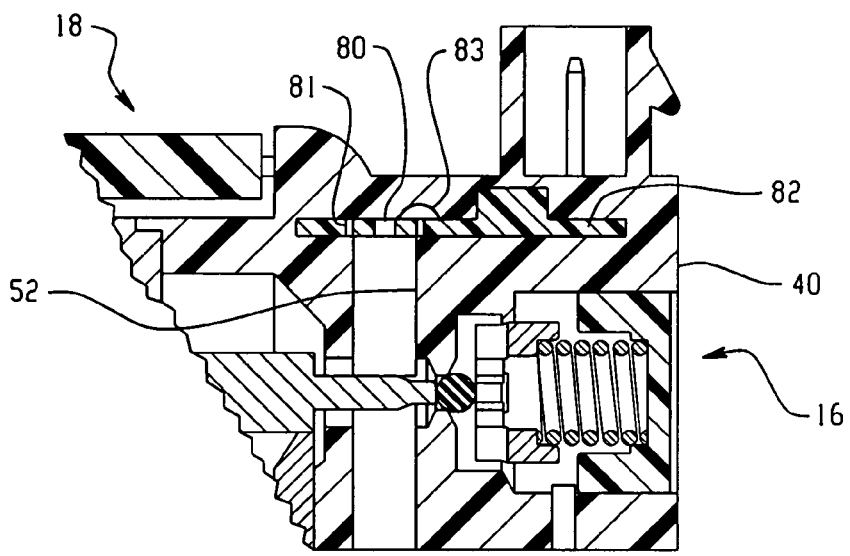
FIG. 8 is a partial section view taken through the longitudinal center line of the valve of FIG. 2 showing in detail a technique for preparing the transducer on a circuit board for overmolding.

In the present practice of the invention it has been found convenient to employ high temperature solder to attach the die 80 to a ceramic ring 81 or alternatively by other suitable techniques such as that known as solder glassing; and, the die then wire bonded at 83 to the substrate 82 as shown in greater detail in FIG. 8.

In the present practice of the invention the receptacle 85 may be provided on a bobbin flange, one of which is illustrated and denoted by reference numeral 98. In the present practice of the invention it has been found desirable to form the receptacle 85 integrally with receptacle 98 of bobbin 64. Upon plug-in connection of the valve body terminal 86 into receptacle 85, electrical contact may be made with the ends of the coil conductor by any well known techniques such as by insulation displacement connection. Alternatively, the connection may be made by soldering or crimping to the coil conductor.

If desired, an optional ASIC 88 may be incorporated integrally in the valve as shown in the drawing to simplify the pressure command signal from the controller 32 needed to operate the valve. The ASIC may be overmolded directly in the material of valve body or may be optionally mounted on the substrate or circuit board 82 prior to molding.

In the present practice of the invention, it has been found satisfactory to insert-mold or overmold the transducer 20 by placing the pressure transducer in a mold and overmolding the material of the body 40 of the valve. However, it will be understood that the transducer may be integrally formed in the body by other techniques as, for example, casting body material over the transducer. Although the die 80 is shown in the illustrated embodiment as mounted on a substrate such as a circuit board, it will be understood that the substrate or circuit board may be omitted if desired and the die overmolded directly.

In the present practice of the invention, it has been found advantageous to apply a coating or layer of viscous or pliable material, such as a fluorosilicone or silicone gel over the die to facilitate pressure distribution of the body material during overmolding and to minimize the risk of damage to the connections of bond wires 83 to die 80.

Figure 9:
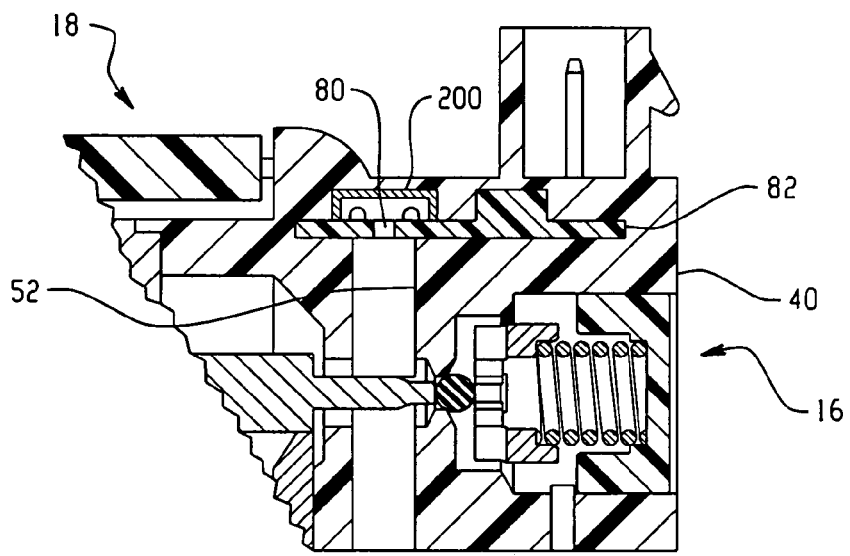
FIG. 9 is a view similar to FIG. 8 of another technique for preparing the transducer in a circuit board for overmolding.
Figure 10:
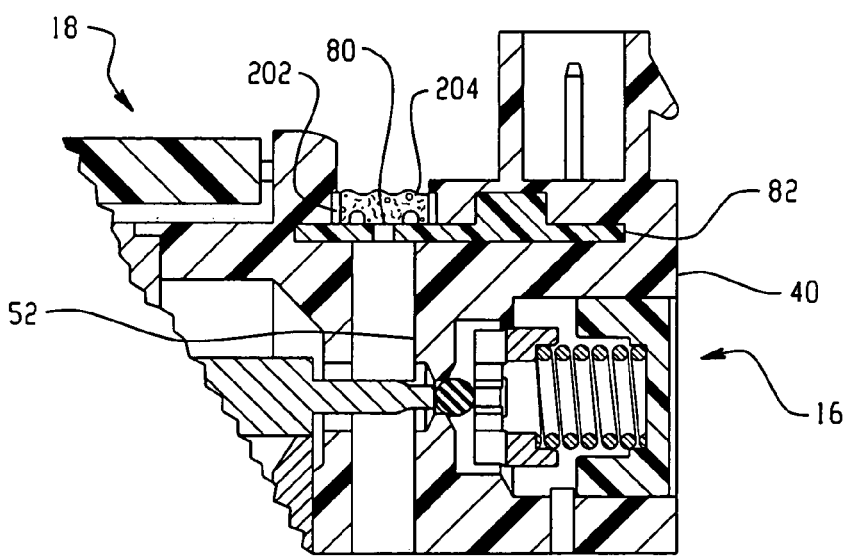
FIG. 10 is a view similar to FIG. 8 of yet another technique for preparing a transducer on a circuit board for overmolding; and, FIG. 11 is a view similar to FIG. 8 of an arrangement of the valve with the transducer integrally formed by the two-shot molding.

Referring to FIG. 9, the die 80 is shown as alternatively as integrally formed, being covered with a protective cap 200, which may be of any suitable non-conductive material such as ceramic or other relatively rigid material which tends to absorb and dissipate the pressure of the body material during overmolding. Referring to FIG. 10, the die 80 is shown as alternatively integrally formed as being surrounded by a guard ring 202 which may be of any suitable material such as ceramic material, disposed on the upper side of substrate or circuit board 82; and, the ring 202 may have a suitable soft material 204 such as the aforesaid gel disposed therein over die 80 to dissipate the pressure of the body material during overmolding. Optionally, the gel may be covered by a thin disc or cover plate (not shown).

In the event that the valve 16 will be exposed to unusually severe installation or service conditions where a material is chosen for the body 40 which has a relatively high hardness for robustness and relatively high molding pressures are required, the transducer may optionally be first overmolded with a plastic material with greater compliance than the material chosen for the body and subsequently insert molded with the desired body material, such as by two-shot or insert molding. For example, the material of the first shot or direct overmold of transducer 20 may have a relatively high plasticity or softness; whereas, the desired body material may have a relatively high stiffness or hardness, such as by having a greater percentage of glass particulate fill than the material employed for directly overmolding the transducer 20.

Figure 11:
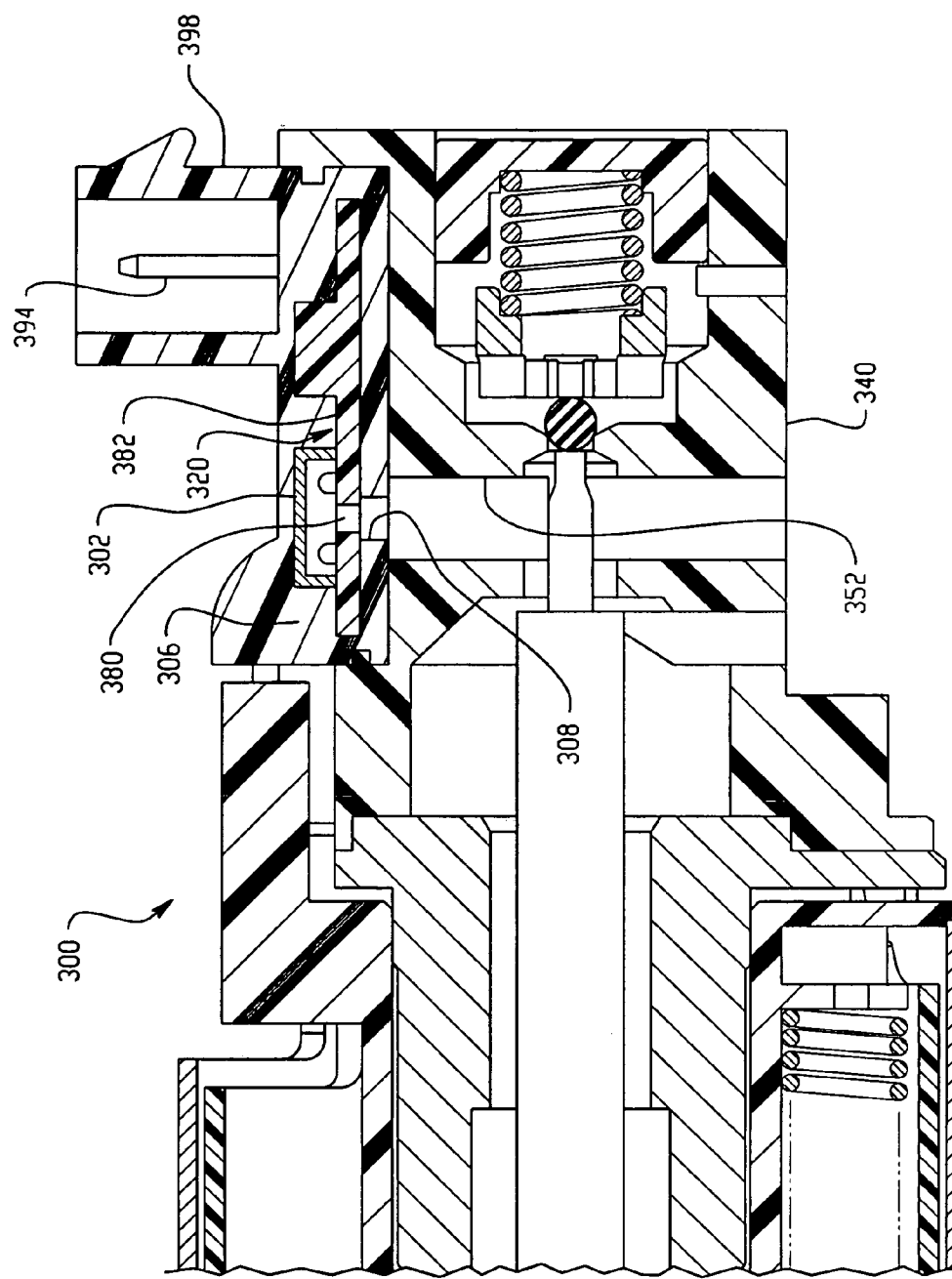

Referring to FIG. 11, an alternate embodiment of the valve is indicated generally at 300 wherein the transducer indicated generally at 320 is formed by mounting a die 380 on a substrate 382 and wire bonding the leads of the die to the circuit on the substrate. The die and wire bonded leads are then covered with a cap 302 and the transducer assembly 320 then inserted in a mold and overmolded with material to form a subassembly indicated at 306 in FIG. 11 which includes the receptacle 398 and terminal connector pins such as 394. The subassembly 306 is then inserted in a mold and overmolded with the material of the valve body 340 to form a completed valve assembly. It will be understood that an aperture 308 is formed in the subassembly 306 to provide access of the undersurface of the die 380 with the signal pressure port 352 formed in the valve body. The arrangement of FIG. 11 thus permits a more compliant or softer material for the subassembly 306 to facilitate molding about the transducer 320 and permits a harder more robust material to be employed for the valve body 340.

Referring to FIGS. 3 and 4, in the illustrated embodiment, the substrate or circuit board 82 may have the terminal strips, one of which is illustrated and identified by reference numeral 86 mounted at one end through the circuit board 82, it will be understood that the unshown terminal 84 may be similarly attached to the substrate or circuit board 82. Alternatively, the terminals may be connected with wires soldered to the substrate or circuit board.

The opposite end of the circuit board has attached thereto a plurality of connector pins 91 through 96, with one of the pins 96 illustrated in FIG. 4; and, the pins 91 through 96 extend outwardly through the valve body and into a receptacle 98 which may be provided on the valve body for facilitating external electrical connection thereto. In the present practice of the invention, it has been found satisfactory to form the receptacle integrally with the valve body, for example, by molding including injection molding or casting.

A casing or shell 73 is received over the insulator 68 and has one end thereof deformed, such as, by crimping over a body flange 90 as shown in FIG. 2, with the opposite end deformed or crimped radially inwardly at 75 over the end of the flux collector 70. The casing 73 may serve to complete a flux loop about the coil. This arrangement thus retains the assembly of the pole pieces and bobbin with coil onto the body. It will be understood that upon making this assembly, the terminal strips 84, 86 engage the receptacle 85 in plug-in engagement.

Figure 6:
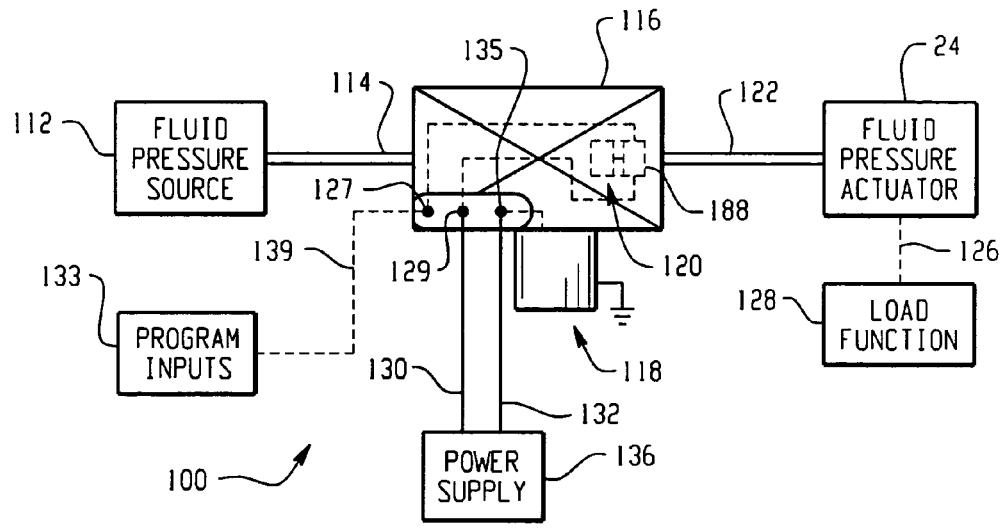
FIG. 6 is a view similar to FIG. 1 of an embodiment with an electronic controller formed integrally with the valve body.

Referring to FIG. 6, another embodiment of the system of the present invention is indicated generally at 100 and includes a fluid pressure source 112, a pressure control valve 116 and an electric valve operator 118 such as a solenoid. The valve 116 may be electro-mechanically similar to that of the valve 16 described hereinabove with reference to FIGS. 2-5 and is made in the same manner such as by overmolding non-metallic body material over a pressure transducer. For convenience of illustrations and description the components of the valve 116 corresponding to those of the valve 16 have the last two digits of the reference numerals of FIG. 6 and FIG. 7, the same as those of the reference numerals in FIGS. 1-5. The valve 116 receives at its inlet pressurized fluid from source 112 along conduit 114. The valve 116 has integrally formed therein a pressure transducer indicated generally at 120 and which may be of the same type as described hereinabove for the transducer 20. The valve 116 also includes integrally formed therein an ASIC 188 which includes the functions of an electronic controller as will be described hereinafter with greater detail.

The outlet of valve 116 provides a fluid pressure signal through conduit 122 to a fluid pressure actuator 124, the mechanical output of which is applied, as indicated by the dashed line in FIG. 6, to perform a load function indicated by reference numeral 128. A power supply 136 provides the power source along lines 130, 132 to the pressure transducer 120, the electrical operator 118, and the controller comprising an ASIC 188 via connection to terminals 129, 135 on the valve 116. If desired, optional Program Inputs 133 may be supplied along dashed outline 139 to terminal 127 on the valve 116, which terminal it will be understood is internally connected to the ASIC 188 as shown in dashed line in FIG. 6.

Figure 7:
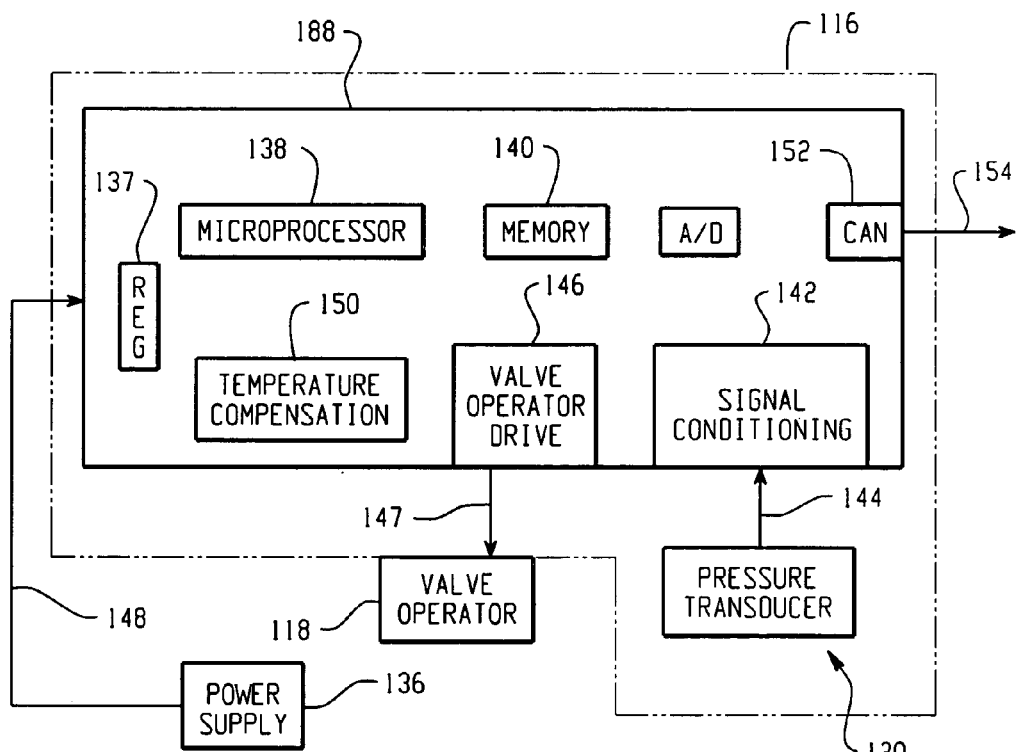
FIG. 7 is a block diagram of the functions of the controller of the system of FIG. 6.

Referring to FIG. 7, the operational functions incorporated in the ASIC 188 are indicated as including regulator 137, microprocessor 138, a memory 140, signal conditioning circuitry 142 for receiving the signal from pressure transducer 120 along line 144 and the valve operator drive circuitry 146 providing an output along line 147 to the valve operator or solenoid 118. The power supply 136 provides power to the ASIC as indicated along line 148.

A temperature compensation circuit 150 and a communications circuit 152, such as, circuitry of the type for interfacing with a CAN bus provides a communication signal along line 154. Alternatively, communications circuit 152 may include other protocols such as LIN, MOST, etc. and may also provide a voltage signal such as a linear 0-5 Volt input signal.

The ASIC 188 may thus provide any one or any combination of the following functions: (a) communications function, (b) a microprocessor function for memory and algorithm calculations and command signals, (c) a power driver and (d) a sensor signal conditioning to amplify conditions and/or correct the sensor signal including temperature correction, if required. The microprocessor may be used to store local or low level algorithms such as PID type control or similar control of the valve and may include diagnostic routines. The valve operator drive electronics may include a power transistor such as an FET and other pre-drive circuitry. The communications bus is disposed to receive a signal and also report solenoid valve output pressure. If desired, diagnostics may be included such as for indicating a stuck valve by detecting no change in output pressure in response to changes in the drive signal. The signal conditioning temperature and compensation may include amplifiers, filters and other similar circuitry to condition the raw signal from the pressure transducer. The memory may be used for storing constant gain values and desired fault codes.

An advantage of the embodiment of the ASIC 188 shown in FIG. 7 is that the amount of calculation and control algorithm required in the external system circuitry is minimized, thereby simplifying the use of the valve in various systems, particularly a transmission control module in an automotive automatic transmission application. The arrangement of FIG. 7 may be a three connector terminal device with power, ground and signal pins utilizing internal connections to the solenoid, thereby minimizing the number of external terminal connections required to the valve.

It will be understood that ASIC 188 may be programmed to provide a predetermined pressure output signal in response to varying temperature or inlet pressure or other environmental or ambient conditions. Alternatively ASIC 188 may be circuit connected to receive program inputs from an unshown source, but similar to inputs 33 in FIG. 1.

The present invention thus provides a unique electrically operated pressure control valve assembly with an integrally formed pressure transducer sensing pressure at the valve outlet which, when coupled with an electronic controller receiving the transducer signal and in response thereto generating a valve control signal, provides a system for closed loop control of the valve pressure output. An ASIC may also be integrally formed with the body to provide additional signal processing. In addition, the controller may be disposed in the ASIC for providing a valve with self contained electronic controller. Either or both the pressure transducer and ASIC may be integrally formed in the material of the body such as by overmolding, either directly or on a substrate or circuit board. The electrically operated invention valve with integral pressure transducer may thus be employed in a system for providing closed loop pressure control of a fluid pressure signal to a fluid pressure responsive actuator for performing a function, such as operating shifting clutches in an automatic power transmission for driving a vehicle.

Although the invention has hereinabove been described with respect to the illustrated embodiments, it will be understood that the invention is capable of modification and variation and is limited only by the following claims.

What is claimed is:

1. A method of making a valve assembly for closed loop pressure control comprising:
    (a) forming a valve body with a valving chamber communicating with an inlet and outlet;
    (b) disposing a valve member in the valving chamber for movement between a position increasing and a position decreasing fluid pressure communication between the inlet and outlet;
    (c) disposing an electrical operator on said body and upon energization effecting said movement of the valve member;
    (d) integrally forming a pressure transducer in the material of the valve body to substantially enclose the pressure transducer in the valve body and sensing pressure in said outlet and providing an electrical indication thereof; and, disposing electrical terminal on said body for electrical connection thereto; and
    (e) disposing an ASIC and overmolding the ASIC with the valve body material.

2. A closed loop fluid pressure control system comprising:
    (a) a fluid pressure operated actuator operative for effecting a function to be controlled;
    (b) a source of pressurized fluid;
    (c) an electrically operated pressure control valve having a body with an inlet connected to receive said pressurized fluid and an outlet connected to said actuator;
    (d) a pressure transducer integrally formed in the valve body and substantially enclosed by the valve body, the pressure transducer being operative, upon circuit connection thereto, for providing an electrical indication of the pressure in said outlet; and,
    (e) an electronic controller disposed in circuit to receive said electrical indication from said transducer and operative in response thereto to generate and supply an electrical control signal to said electrically operated valve for a desired outlet pressure thereby providing closed loop pressure control of said actuator; and
    (f) wherein said pressure transducer is overmolded within the material of the valve body.

3. The system defined in claim 2, wherein said transducer is mounted on a substrate.

4. The system defined in claim 3, wherein said substrate includes an ASIC.

5. The system defined in claim 2, wherein said electronic controller is located remote from said electrically operated valve.

6. The system defined in claim 2, wherein said electrically operated valve includes a solenoid.

7. The system defined in claim 2, wherein said pressure transducer is mounted on a substrate including connector terminal and said solenoid electrically connects to said terminal in plug-in arrangement.

8. The system defined in claim 2, further comprising an ASIC formed integrally in said body.

9. The system defined in claim 8, wherein said ASIC includes said electronic controller.

10. The system defined in claim 2, wherein said pressure transducer includes a die mounted on a ceramic ring.

11. An electrically operated fluid pressure control valve capable of closed loop pressure control upon energization comprising:
    (a) a valve body defining an inlet, an outlet and a valving chamber communicating with the inlet and outlet;
    (b) a valve member disposed in the valving chamber and moveable therein between a position increasing and a position decreasing fluid flow between the inlet and outlet;
    (c) an electrical operator associated with said body and operable, upon energization for effecting the movement of said valve member; and,
    (d) a pressure transducer disposed for sensing pressure in said outlet and
    (e) an electronic controller disposed in a circuit with said transducer and said electrical operator, wherein said transducer and said controller are integrally formed in said body and wherein said transducer is substantially enclosed by the valve body; and
    (f) wherein said transducer and said controller are overmolded in the material of the body.

12. The valve defined in claim 11, wherein said body is molded of non-metallic material.

13. A method of making an electrically operated pressure control valve for closed loop pressure control comprising:
    (a) forming a valve body of non-metallic material with an inlet, outlet and a valving chamber communicating with the inlet and outlet;
    (b) disposing a valve member in said chamber for movement therein to increase or decrease flow between the inlet and outlet;
    (c) disposing an electrical operator in association with the body, and, upon energization, effecting said movement of said valve member; and,
    (d) integrally forming a pressure transducer and an electronic controller in the material of the valve body to substantially enclose the transducer in the valve body and connecting said controller in circuit with said transducer and said electrical operator wherein said step of integrally forming a pressure transducer and an electronic controller includes overmolding.

14. The method defined in claim 13, wherein said step of overmolding includes overmolding first with plastic material of relatively high plasticity and subsequently overmolding with plastic material of relatively high hardness.

15. The method defined in claim 13, wherein said step of overmolding includes one of (a) injection molding, (b) casting and (c) insert molding.

16. The method defined in claim 13, wherein said step of integrally forming an electronic controller includes overmolding an ASIC.

17. The method defined in claim 13, wherein said step of disposing an electrical operator includes disposing a solenoid.

18. The method defined in claim 13, wherein said step of disposing an electrical operator includes engaging a solenoid in plug-in engagement with said valve body.

19. The method defined in claim 13, wherein said step of integrally forming a pressure transducer includes mounting a die on a ceramic ring.

20. A method of making an electrically operated pressure control valve for closed loop pressure control comprising:
   (a) forming a valve body of non-metallic material with an inlet, outlet and a valving chamber communicating with the inlet and outlet;
   (b) disposing a valve member in said chamber for movement therein to increase or decrease flow between the inlet and outlet;
   (c) disposing an electrical operator in association with the body, and, upon energization, effecting said movement of said valve member; and,
   (d) integrally forming a pressure transducer and an electronic controller in the material of the valve body to substantially enclose the transducer in the valve body and connecting said controller in circuit with said transducer and said electrical operator; and
   (e) wherein said step of integrally forming a pressure transducer and an electronic controller includes mounting a piezoelectric device and an ASIC on a substrate, and wherein said integrally forming includes overmolding said piezoelectric device, said ASIC and said substrate.

21. The method defined in claim 20, wherein said step of overmolding includes applying a viscous material and overmolding with plastic material.

* * * * *